United States Patent [19]

Lebizay

[11] Patent Number: 4,695,999
[45] Date of Patent: Sep. 22, 1987

[54] CROSS-POINT SWITCH OF MULTIPLE AUTONOMOUS PLANES

[75] Inventor: Gerald Lebizay, White Plains, N.Y.

[73] Assignee: International Business Machines Corporation, Armonk, N.Y.

[21] Appl. No.: 903,862

[22] Filed: Sep. 2, 1986

Related U.S. Application Data

[63] Continuation of Ser. No. 624,881, Jun. 27, 1984, abandoned.

[51] Int. Cl.⁴ ............................................. H04Q 11/04
[52] U.S. Cl. ............................................ 370/58; 370/16
[58] Field of Search .................... 370/58, 16, 63, 64; 340/825.8, 825.79, 825.01; 179/18 GF; 379/221, 273; 178/3

[56] References Cited

U.S. PATENT DOCUMENTS

| | | | |
|---|---|---|---|
| 3,597,548 | 8/1971 | Drinnan et al. | 370/64 |
| 3,705,266 | 12/1972 | Philip | 370/64 |
| 3,832,492 | 8/1974 | Charransol et al. | 370/64 |
| 3,886,318 | 5/1975 | Charransol et al. | 370/16 |

*Primary Examiner*—Douglas W. Olms
*Attorney, Agent, or Firm*—Sughrue, Mion, Zinn, Macpeak and Seas

[57] ABSTRACT

A multi-plane cross-point switching system in which a communication message from a sender is divided into a plurality of data links that are separately connected through autonomous cross-point switches to the receiver where the links are recombined. The cross-points in each plane are separately set by control messages transmitted along with the separate parts of the divided message.

6 Claims, 8 Drawing Figures

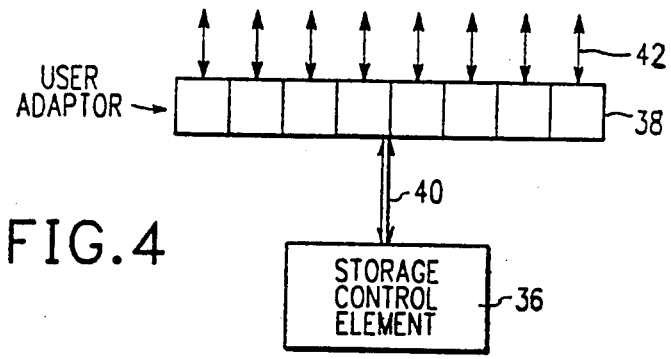
FIG.4
FIG.5
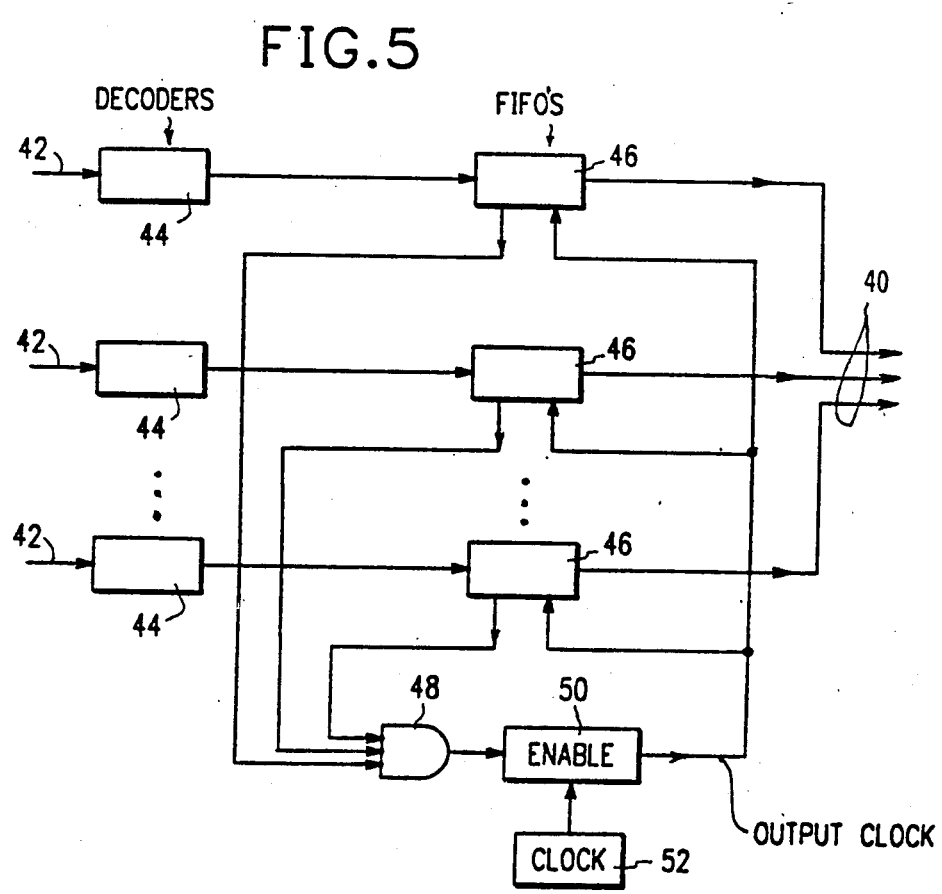

SWITCH PLANE DATA FLOW

CROSS-POINT SWITCH OF MULTIPLE AUTONOMOUS PLANES

This is a continuation, of application Ser. No. 624,881 filed June 27, 1984, now abandoned.

DESCRIPTION

TECHNICAL FIELD

This invention relates to cross-point switching systems. In particular, it relates to a very high speed cross-point switching system of nearly independent planes of cross-point switches.

BACKGROUND OF THE INVENTION

Computers and data processing systems of the future will in general need to be designed for operating speeds substantially higher than those of present day equipment. The operating speed of single processors has reached a limit that is not likely to be sufficiently extended with foreseeable technology to meet these future requirements. A common approach has been to use multi-processor systems in which theoretically the operating speed of the system is the sum of the speeds of the individual multi-processors. One form of such a multi-processor system is illustrated in FIG. 1 in which there are multiple processors 10, each having an associated fast cache memory 12 and a larger but slower local memory 14. One or more of the processors may be dedicated to particular functions for the entire system, such as input/output or supporting a bulk memory. The processors 10 are operating fairly independently of each other and communicate with each other by sending transmissions over channels 16 through a common switch 18.

The function of the switch 18 is, under the control of a command sent from a requesting processor, to connect the channel 16 from the requesting processor 10 to the channel 16 to another designated process 10. Thereby the two processors 10 are in momentary communication. Once the communication, perhaps involving a response, has been completed, the switch 18 disconnects the channels 16 connecting the two processors 10.

The communication between the processors 10 can have widely varying characteristics. A processor 10 may want to send a large number of short messages to one or more other processors 10. Each message requires a connection to be made and broken in the switch 18. On the other hand, fairly large blocks of data may need to be transferred between processors 10. Once choice for data transfer is to organize the data in pages, each page containing 4 kilobytes of data. It is desirable that the entire transfer of the page of 4 kilobytes occurs in less than 10 microseconds. It must be remembered that the data path in a large data processing complex can easily extend for 100 meters which translates to a propagation time of 0.5 microsecond for a 5 nanosecond per meter channel.

It is seen that the switch 18 is the central element of the illustrated multi-processor system. While the processors 10 can be multiplied for increased speed and capacity, all information flow is through the switch 18. Thus the switch 18 is likely to be the limiting factor for a high speed, large-scale data processing complex.

The processors 10 of such a system would each be operating in the range of 50 to 100 MIPs. The channels between the processors 10 are likely to be optical fiber paths. At the present time, data rates of 100 megabits per second appear feasible and it is likely that fiber optic data rates will be extended into the multi-gigabit range. These speeds will put an extreme demand upon the switch 18 of a multi-processor system and such switch speeds appear unavailable with conventionally designed switches.

The switch 18 should also have a flexible design. Short messages and large blocks of data put different demands upon the switch 22. Although the short messages require only a lower bandwidth, a high frequency of messages will require that the set-up time in the switch 18 be minimized. Furthermore, a typical data processing complex is not designed as an entity. Instead, additional processors 10 are added as greater demands are put upon the system. Furthermore, when newer and faster processors and communication channels become available, they are likely to be added onto an existing system rather than to replace the existing and slower components. As a result, the switch 18 should have the capability of providing both incremental bandwidth as well as variable bandwidth depending upon interconnection being made. No such variable bandwidth switch is known to be currently available.

One of the advantages of the multiprocessor system of FIG. 1 is the system reliability afforded by the multiplicity of the processors 10. If one processor 10 or associated channel 16 fails, the remaining processors 10 can continuing operating. Although the system performance is degraded by the loss of the failed component, there are a sufficient number of remaining operable components so that the system performance remains satisfactory. Alternatively, spare processors 10 can be included in the system to replace any failed component. High reliability is particularly required in large data processing complexes such as credit card or banking operations which support a large number of terminals in real time. The switch 18 of the illustrated multi-processor system however, presents a single point failure. Accordingly, a mean time between failure of 100 years for the switch 18 is not an unreasonable requirement.

Such reliability is not considered available in the current cross-point switches.

SUMMARY OF THE INVENTION

Accordingly, the present invention seeks to provide a very high speed cross-point switch.

The invention also seeks to provide a cross-point switch with variable bandwidth.

The invention further seeks to provide a cross-point switch of extreme reliablity.

The invention can be summarized as a cross-point switching system consisting of multiple planes of cross-point switches. An adaptor, attached to every device connected to the switch, separates its data onto a number of parallel data paths. Depending upon the bandwidth required, one or more of these data paths are connected to each of multiple planes of cross-point switches which are operating nearly independently of each other. The adaptor separately establishes the connection through each of the planes. At the receiving adaptor, a resynchronization buffer resynchronizes the data received on the channels through the various switching planes and converts the data back into a single data flow.

BRIEF DESCRIPTION OF THE DRAWINGS

FIG. 4 is a block diagram of the user adaptor of the present invention.

FIG. 5 is a block diagram of a resynchronization circuit.

DETAILED DESCRIPTION OF THE PREFERRED EMBODIMENTS

Figure 1:
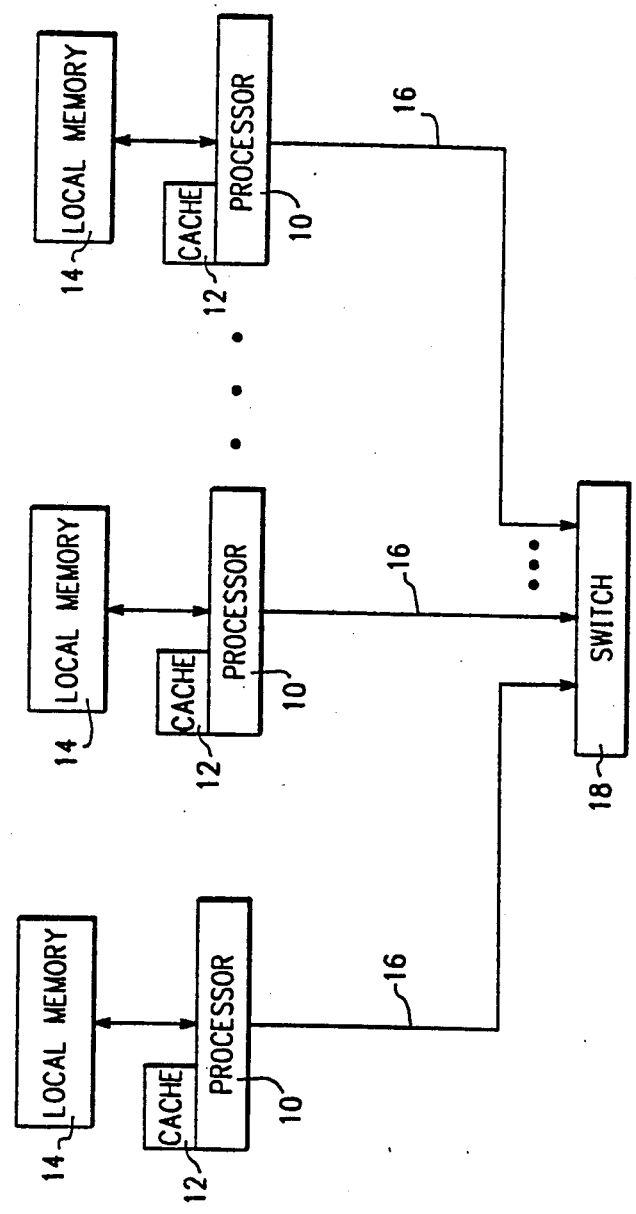
FIG. 1 is a block diagram of a conventional multi-processor system.
Figure 2:
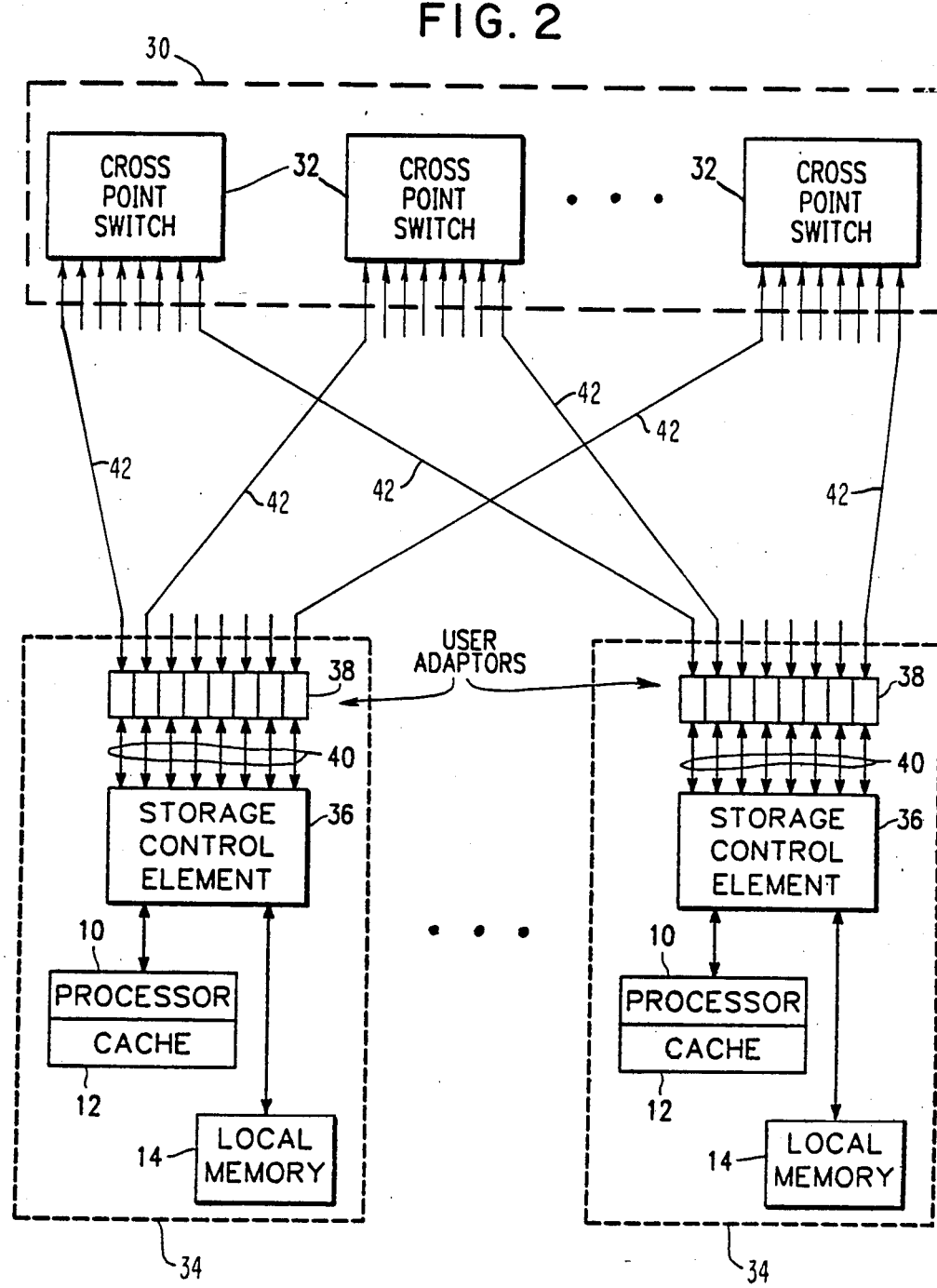
FIG. 2 is a block diagram of a multi-processor system using the multi-plane cross-point switch of the invention.

The invention, as illustrated in FIG. 2, includes a central switch 30 comprising multiple planes of independent cross-point switches 32. The number of cross-point switches 32 or planes is n, which is preferably a positive power of 2, e.g. 2, 4, 8, etc. The value of n is one parameter determining the bandwidth of the switch and maybe a very large number. Each cross-point switch 32 is an m×m matrix of cross-points with m ports. The preferred embodiment of the cross-point switch 32 will be described later.

There are a number U of users 34. Each user 34 comprises a processor 10 with a fast cache memory 12 and a larger but slower local memory 14. For high speed multi-processor systems, the number U of processors 10 can be a large number, such as 256. One or more processors 10 are assumed to be dedicated to supporting these shared memories and the input/output functions. A storage control element 36 is attached to each user and controls the flow of data between the processor 10 and the local memory 14, as well as the data flow external to the user. Each user 34 also has a user adaptor 38 linked to the storage control element 36 of that user by an internal memory bus 40. The internal memory bus 40 is B bytes wide, that is, B sets of 8 parallel serial lines since there are 8 bits per byte. The adaptor 38 of each user 34 is linked to the n crosspoint switches 32 by N serial links 42 with at least one serial link 42 to each cross-point switch 32. At this point in the discussion, two simplifying assumptions will be made. First of all, it will be assumed that only one serial link 42 connects any user adaptor 38 to a particular cross-point switch 32. As a result, n=N and m=U. The second assumption is that the width 8B of the internal memory bus 40 is equal to the number of serial links 42, that is, 8B=N. In the general case of the invention, neither of these simplifying assumptions is true.

The separate planes 32 of the central switch 30 are controlled in their switching by the user adaptors 38 over the serial links 42. As a result, the planes 32 are independent of each other and the only coordination between planes is performed by the user adaptors 38 which issue connection and disconnection commands to the separate cross-point switches 32. When a storage control element 36, under the control of its processor 10, wishes to send or receive data from another user 34, the adaptor 38 of that user 34 issues nearly simultaneous commands to all the planes 32 to make the proper connection on each plane 32. If the connections are properly made, N serial links passing through the n planes 32 of the central switch 30 connect the two user adaptors 38 of the two users 34. Once the connections are made, the total bandwidth of the link is N times the bandwidth of the serial links 42 and of the separate cross-point switches 32.

The bandwidth of the central switch 30 can be increased by increasing the number n of planes 32 within the switch. Because of the modular nature of the central switch 30, this increase in bandwidth can be performed upon an existing system by adding more planes 32. The previously existing planes 32 need no modification in the enhanced switch 30. Of course, the user adaptor 38 would need to be modified to accommodate the increase in the number N of serial links 42.

Because the cross-point switches are independent, the failure of any one plane 32 will not affect the operation of the other planes 32 within the central switch 30. This independence offers increased reliability if the user adaptors 38 are designed to bypass any failed cross-point switch 32. Two approaches can be used to effect this increased reliability. In the first approach, the failed cross-point switch 32 is removed from service and the user adaptors 38 adjust their distribution of data onto the serial links 42 to avoid the failed cross-point switch 32. The receiving user adaptor 38, of course, must also make a corresponding change on the received data. The result is that the transmission bandwidth is reduced by 1/n for every failed cross-point switch 32. In the second approach, additional spare planes of cross-point switches are provided above the number n required for a fully operable system. Whenever a crosspoint switch 32 fails, it is removed from service and replaced by one of the spares. It is of course desirable that the changeover can be performed electronically and automatically. Such an electronic changeover requires that the user adaptors 38 have serial links 42 to all the spare planes 32 and that the user adaptor 38 can automatically switch their outputs to usable planes 32.

The use of multiple planes of cross-point switches is of itself old in the telephone industry. Examples are discussed by Lawrence in U.S. Pat. No. 4,201,891 and by Joel in U.S. Pat. No. 4,349,702. Furthermore, it is well known that one or more spare planes can be provided to substitute for failed planes. Such examples are discussed by Zaffignani et al in U.S. Pat. No. 4,144,407, by Pepping et al in U.S. Pat. No. 4,146,749 and by Mauchetti et al in U.S. Pat. No. 4,160,130. However, in all these patents, a communication path is selected through only one plane. Simultaneous and parallel paths are not set up for a single divided message as is done in this invention.

Figure 3:
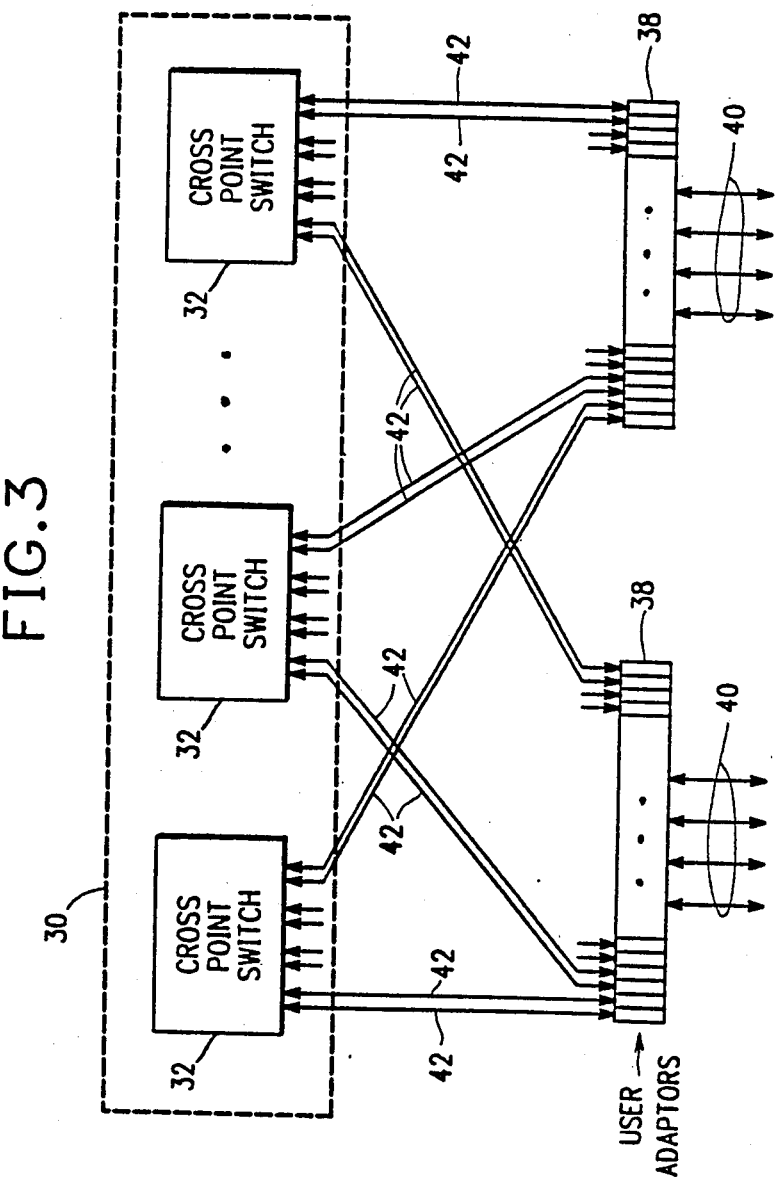
FIG. 3 is a block diagram of another embodiment of the cross-point switch of the invention.

In another embodiment of the invention, illustrated in FIG. 3, more than one serial link 42 links each user adaptor 38 to each plane 32 in the central switch 30. This condition violates the previous simplification that N=n. Let the number of serial links 42 between each adaptor 38 and each plane 32 be the number g. In the simplified case, g=1. However, g can be assigned a higher value, preferably a power of 2, such as 2, 4, 8, etc. The higher values of g allow for a high bandwidth central switch without a corresponding increase in the number of planes 32. The number n of planes 32 is related to the number N of serial links 42 by the relation ng=N. If there are a number U of adaptors 38, or equivalently of users 34 or of processors 10, U=m/g, where m is the number of ports upon each of the cross-point switches 32. Of course, higher values of g will either reduce the number U of users that the central switch 30 can service, or alternatively requires an increase in the size m of the m×m cross-point switching matrix in each plane 32. For a fixed bandwidth and a given number U of users, g, m and n can be selected with the above relations kept in mind to produce the most cost effective central switch 30.

The user adaptor 38 will now be described in more detail, with reference to FIG. 4. In the simplest case, the user adaptor 38 connects N serial links 42 to an internal memory bus 40 also having N parallel lines. However, as previously mentioned, the number of serial links 42 can be increased to N+M to allow for M spare planes in the central switch 30. In general, the number of lines in the internal memory bus 40 is equal to a number 8B which is chosen based upon the technology of the processor 10 and the storage control element 36 rather than for the central switch 30. This generalization violates the second previous simplifying assumption. For present day thermal conduction modules, internal memory buses 40 are conveniently in the range of 32 to 64 bytes wide, i.e., B=32 or 64. While the serial links 42 are likely to be implemented in very high speed fiber optics, the internal memory bus 40 will likely continue to be fairly conventional electrical paths. Accordingly, the bus width 8B is likely to increase far beyond the number N of serial links 42. On the other hand, it is conceivable that fairly low speed serial links 42 could be used which would have a lower individual bandwidth than the individual lines of the internal data bus 40.

The data flow through the multiple planes 32 of the central switch 30 is performed independently over the N serial links 42. Whatever clocking is required is provided by the user adaptors 38. As a result of the independent flow and the very high data rates which are envisioned for the invention, it is likely that the parallel data flow will become desynchronized as it proceeds through the central switch 30. That is, parallel data which were synchronized at the transmitting user adaptor 38 arrive at the receiving user adaptor 38 at an indeterminate phase with respect to each other. Furthermore, a modular design may dictate that an adaptor 38 has separate clocks for each of the serial links 42 so that even synchronization at the sending end cannot be assumed. Accordingly, it may be necessary to provide a resynchronization circuit in the user adaptor 38 in order to allow for synchronized parallel data flow in the internal data bus 40. An example of a resynchronization circuit is illustrated in FIG. 5.

Possibly desynchronized data is received on the serial links 42 and are separately decoded in decoders 44 to convert the transmitted data into a format by the user device. The form of the coding will be described later. The decoders 44 output to first-in, first-out buffers 46 only valid data. Each buffer 46 has an output indicating that the particular buffer 46 contains at least one bit of data. These outputs are combined in an AND gate 48. The AND gate 48 outputs a true signal when all the buffers 46 contain valid data and this output triggers an enable circuit 50 which passes an output clock signal from a clock 52 in the user adaptor 38. The output clock signal is simultaneously fed to all the buffers to clock out the buffered data onto the individual lines of the internal memory bus 40. The enable circuit 50 is preferably designed to enable the clocking of one serial byte of information per trigger from the AND gate 48. Subsequent bytes read into the parallel buffers 46 need to reenable the output clock signal. The byte by byte resynchronization is required by the fact that the clock 52 of the receiving adaptor is operating independently of the clock of the transmitting adaptor so that the relative phase of the two clocks may drift.

Figure 6:
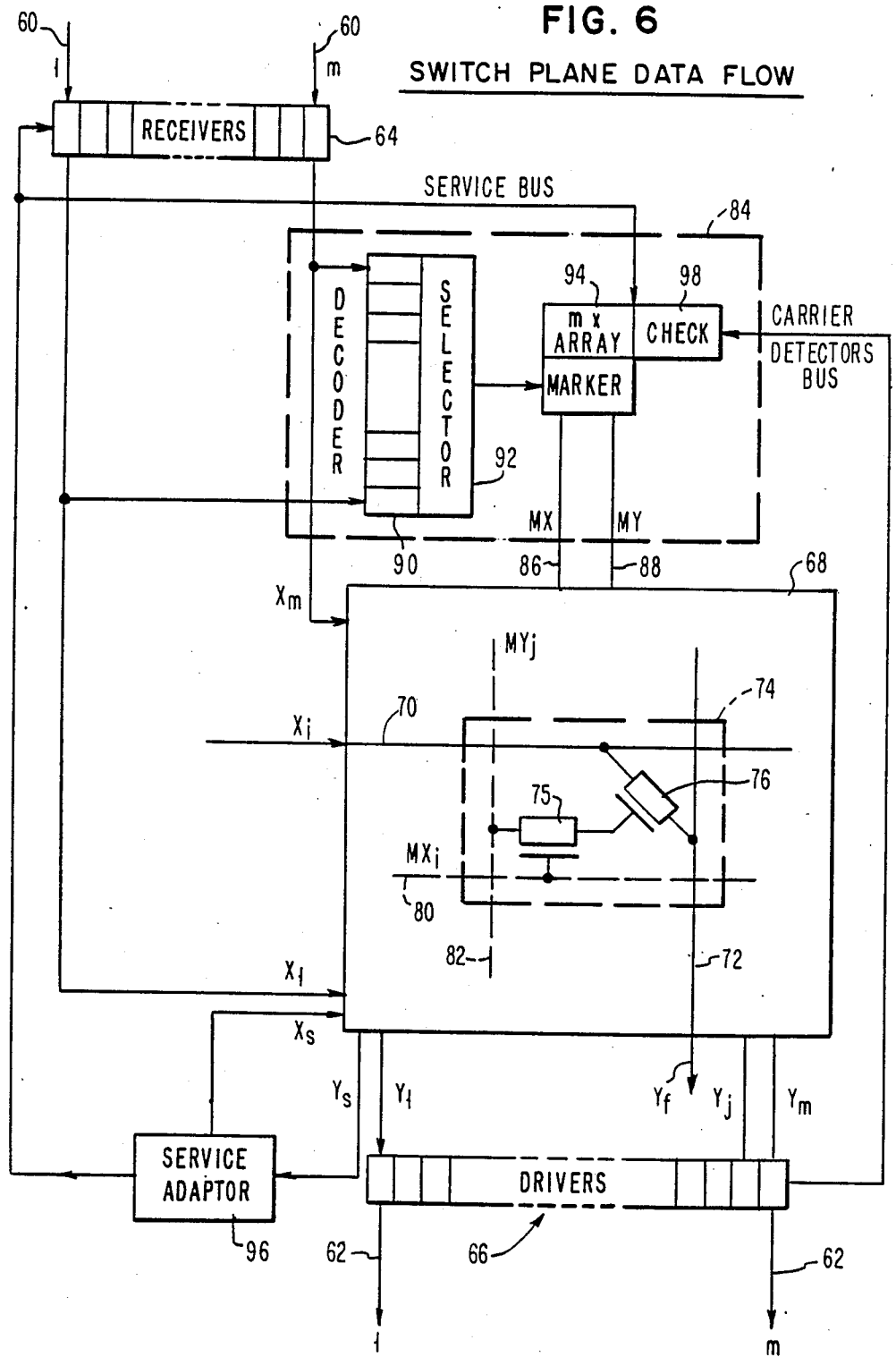
FIG. 6 is a block diagram of one plane of a crosspoint switch usable with this invention.

A more detailed description will now be presented for the structure of the cross-point switches 32. A simplified schematic diagram of a single plane for cross-point switch 32 is illustrated in FIG. 6 for an m×m cross-point switching matrix. There are m serial input links 60 and m serial output links 62. In the general case, each of the input links 60 is connected to a different user adaptor 38 for a completely independent data path. If g is greater than 1, 2 or more of the input links 60 are connected to the same user adaptor 38. Each input link 60 is connected to its own receiver in a receiver section 64. Likewise, each of the m serial outputs 62 is connected to a separate user adaptor 38 in the case when g is equal to 1. Each of the output links 62 is driven by its own driver in a driver section 66. The outputs of the receiver section 64 are separately connected to m horizontal lines in a cross-point switching matrix 68. For instance, the i-th output is connnected to the i-th horizontal line 70. Similarly, the m inputs of the driver section 66 are connected to m vertical lines in the switching matrix 68. For instance the j-th input is connected to the j-th vertical line 72.

At every one of the m×m intersections of the horizontal and vertical lines is an individually selectable cross-point, such as the cross-point 74 between the i-th horizontal line 70 and the j-th vertical line 72. The cross-point 74 comprises a gate 76 which is turned on and off by another control gate 78. The control gate 78 is acting as an AND gate that is controlled by row control line 80 associated with the horizontal line 70 and by a column control line 82 that is associated with the vertical line 72. When the row and column control lines 80 and 82 are concurrently selected, the cross-point at their intersection is selected. Not shown in FIG. 6 is the latching circuitry that enables the latching of the cross-point 74 by the one time application of control signals on the row and column control lines 80 and 82. Examples of such latching cross-point switching matrices is provided in the U.S. patent application, Ser. No. 544,652 filed on Oct. 24, 1983, by C. J. Georgiou and entitled "Fault-tolerant Array of Cross-point Switching Matrices". That patent application is incorporated herein by reference.

It is assumed that the individual cross points 74 are set by control information transmitted on the same input links 60 that are being connected onto the cross-point matrix 68. A controller 84 is used to receive this control information and to control the row and column control lines 80 and 82 over a row control bus 86 and a column control bus 88. Such a controller is described in another U.S. patent application by C. J. Georgiou, Ser. No. 544,653, filed Oct. 24, 1983 and incorporated herein by reference. The controller 84, in very simple terms, consists of a decoder section 90 of separate decoders attached to each of the outputs of the receiver section 64. The individual decoders decode the data on individual lines and determine if the data contain control information for setting up the switching matrix 68. A selector 92 uses this control information to select the setting of the individual cross-points 74 based upon connections status information contained in an m×1 array 94. A marker 96 performs the actual setting of the cross-points 74.

A service adaptor 96 can also be provided to allow diagnostic inspection of the switching matrix 68 and the controller 84, as directed by service instructions inputted on the inputs links 60. The driver section 66 may additionally be provided with carrier detectors on individual drivers to assure that connected cross-points 74 are continuing to satisfactorily transmit the data modulated carrier. The driver section 66 is then connected to a checking circuit 98 in the controller 84 by a carrier detector bus 100. The checking circuit 98 recognize abnormal data transmission and can initiate a diagnostic routine in the service adaptor 96.

The function of the switching matrix 68 is to selectively connect any one of the m input links 60 to any one of the m outputs links 62. This is a one-to-one connection with each input link 60 being connected to at most one output link 62 at any one time, and vice versa. However, m independent paths can be connected through the switching matrix 68 simultaneously. The above description of the switching matrix 68 describes a two-sided switching matrix with separate input links 60 and output links 62. However, in the previously cited U.S. patent application, Ser. No. 544,652, Georgiou describes a one-sided switching matrix in which the external connections to the switching system can be either input or ouput lines. That is, the serial links 42 would be half-duplex. By half-duplex is meant that the serial links connected to the switching system can at different time can be either input lines or output lines. Such a one-sided switching matrix can advantageously applied to this invention. In that application, Georgiou also describes how the switching matrix 68 can comprise a matrix of switching chips on a single plane. Whether the switching matix 68 is a single integrated circuit chip, a matrix of chips or other configurations is not crucial to the concept of this invention. In yet another U.S. patent application, Ser. No. 599,874, filed Apr. 13, 1984, and entitled "Full-duplex One-Sided Cross-point Switch" (incorporated herein by reference), C. J. Georgiou describes a fullduplex cross-point switching matrix in which two communication paths are always paired through the cross-point switch to allow for simultaneous bi-directional communication. As will be described later, a full-duplex switching system can be advantageously applied to this invention for a simple switching protocol.

It is believed that the multi-plane switching system of this invention would operate even more efficiently if the user adaptors 38 transmit not the original data on the internal memory bus 40, but rather a coded version of the data. One such type of code is the 8B/10B code described by Widmer and Franaszek in an article entitled "A DC-balanced Partitioned Block, 8B/10B Transmission Code" and appearing in the IBM Journal of Research and Development in Volume 27, number 5, Sept. 1983, at pages 440–451. This code is the subject of a U.S. patent application Ser. No. 567,198 filed Dec. 30, 1983, by Widmer. This type of code provides a number of advantages, such as parity checking, a DC-balance code so that AC amplifiers can be used, and the allowance for additional characteristic control words. The coding and decoding could be performed in either the user adaptors 38 or in the storage control element 36 or possibly in the processor 10. The control words would be decoded by the controller 84 in the separate switching planes to initiate the connections and disconnections of the cross-points. However, the coded message could be directed through the switching matrix 68 without decoding. The characteristics of the 8B/10B code can be used in the decoders 44 of the resynchronization circuit illustrated in FIG. 5 for recognizing the beginning of blocks of data. Of course, other types of code can be used with the switch of the present invention or it is possible to transmit uncoded data.

Figure 7:
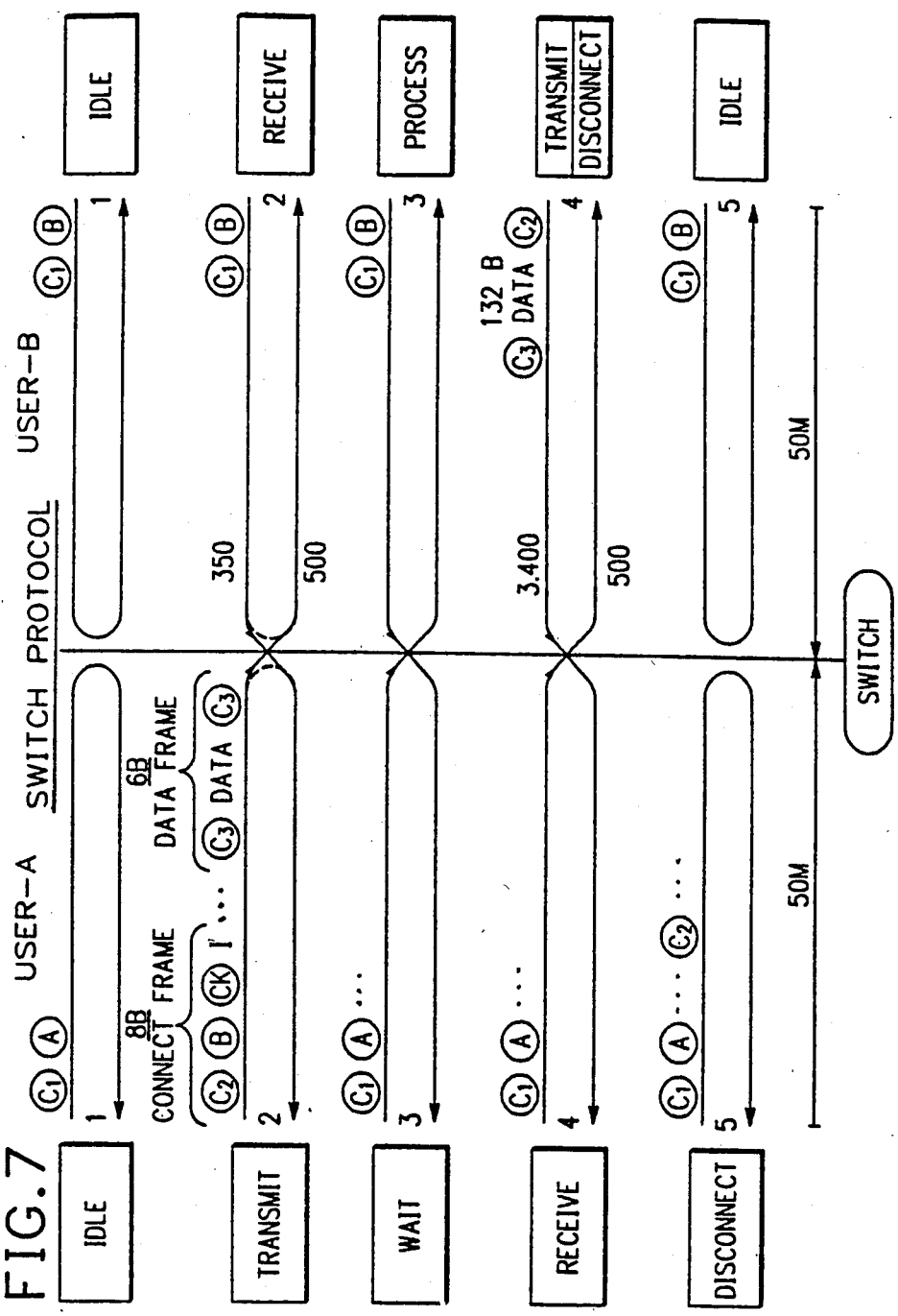
FIG. 7 is a timing diagram illustrating the request and response for the transfer of data.

A possible switching protocol that can be used with the invention will now be described. The protocol assumes several limitations upon the structure of the central switch and the serial links 42. First of all, it is assumed that all data transfer is accomplished by a request/response sequence, that is, that one user requests another user to respond. Prior to the request, there is no connection between the user, and, after the response, the connection is broken. It is further assumed that each adaptor has two serial links to each of the switching planes, one for transmitting and one for receiving. These two links can be considered as a full-duplex link. It is further assumed that the adaptors are continuously broadcasting and receiving at some fixed repetition rate. This continuous broadcasting is illustrated in FIG. 7 for two users A and B connected through the switch of the invention. If user A is not otherwise connected through the switch, the switch connects the input from user A to the output back to user A. Similarly, the output from user B is connected to its own input if the two serial links are not otherwise used. In the idle mode, as illustrated in FIG. 7, both user A and user B are periodically transmitting a characteristic control word $C_1$ followed by the identification of the transmitting user. Because the switch reflects these signals back to the transmitting user, after a propagation time, both user A and user B receive their own idle transmissions. This continuous test sequence tests 99% of the electro-optic path and serves other purposes to be described later.

If user A wishes to transmit a request to user B, user A transmits first an 8 byte connect frame followed by a 6 byte data frame. The connect frame consists of the first byte $C_2$ indicating a request for a connection at the switch. The connect control character $C_2$ is followed by the identification B of the requested destination user. The connect frame finishes up with a clock synchronization sequence and then idle characters. Following the connect frame is the data frame containing data which is delimited at both beginning and the end by delimiting characters $C_3$. The data in the data frame provides the information for the receiving user B to respond to.

The previously mentioned patent application to Georgiou, Ser. No. 544,653, describes a very fast, pipelined marking and unmarking procedure. It is believed that if the connection through the switch is available, it can be accomplished in 50 ns, allowing the following data frame to be transmitted through the switch to the receiving user B. If however the connection cannot be made, for example, because user B is busy, no change in connection is made and the transmitting user A receives back its own connect and data frames. If the connection is successfully made, the transmitting user A receives instead the idle transmission $C_1B$ of the station to which it is transmitting, thus confirming the connection.

Once the receiving user B has received the request, it must spend some time processing this request. During the processing time, user B continues to broadcast its idle code $C_1B$ which is received by the originally requesting user A. This user A is in a wait state awaiting the response and is also continuing to transmit its idle sequence of $C_1A$ which is transmitted to the other user B.

Once the user B has had sufficient time to process the request for data, it proceeds to transmit the data delimited on the forward end by a delimiter $C_3$ and delimited on the trailing by the control character $C_2$. Although the control character $C_2$ was previously used as a connect control character it also indicates to an already connected cross-point that the cross-point is to be disconnected. The data is transmitted in the delimited packet and may be of substantial length, for instance 132 bytes if a page of data is being transferred over 32 channels. On the other hand, the data packet may be short if only a short response message is requested, in which case only a single channel may suffice. This data is the response to the original request and is received by the requesting user A. During the time of the data transmission, the user A continues to broadcast its idle sequence $C_1A$. It is seen that, although a full-duplex serial link is used for setting the connection, once the connection is made the serial link needs only be half-duplex since data is being transmitted only in one direction at any time.

After the data packet has passed through the switch, the cross-point connecting user A to user B is disconnected. The user B then recommences sending its idle sequence $C_1B$ which is reflected back to user B by the switch. The user A, which has continued to transmit its idle sequence $C_1A$ during the data reception, sends out a disconnect control character $C_2$ to insure the disconnection of the switch. When the user A begins to receive its own idle code $C_1A$, it has confirmed that this disconnection of the crosspoint at the switch.

It should be noted that there are two types of disconnections. A disconnection of the crosspoint severs the two connected users. However, the users may be still connected to their respective ports on the cross-point switches. Thus when the destination user B sends its disconnect control character $C_2$, the cross-point is disconnected and the port from user B to the switch is also disconnected. However, the source user A remains connected to the switch. This prolonged connection is useful in that it provides the user A time to process the data transmitted to it without the possibility of another user causing a connection for a request for which user A is not yet ready. Thus when the source user A sends its disconnect control character $C_2$ to the switch, it disconnects itself from the switch and indicates that it is ready for further messages.

The performance of the communication and switching system thus described will now be evaluated. If it is assumed that the user A and the user B are separated from the switch by 50 m, a somewhat extreme case, the propagation time between the switch and either of the users A or B is 250 ns based on a propagation rate of 5 ns/m. Two double propagation times are then involved for the response and request totalling 1 $\mu$s. There is a further 50 ns for marking the cross point. If the serial links are being operated at 400 megabits per second, then the connect and data frames require 280 ns for transmission and the 132 bytes of data require 3.4 $\mu$s for transmission. Thus the total time for the request and response is 4.75 $\mu$s plus whatever processing time is required by the user B. If there are 32 parallel planes in the central switch, 32 packets of 132 bits of data apiece will easily contain a page of 4,096 bytes of data. Thus the described switching system is seen to easily satisfy the required paging time of 10 $\mu$s.

Figure 8:
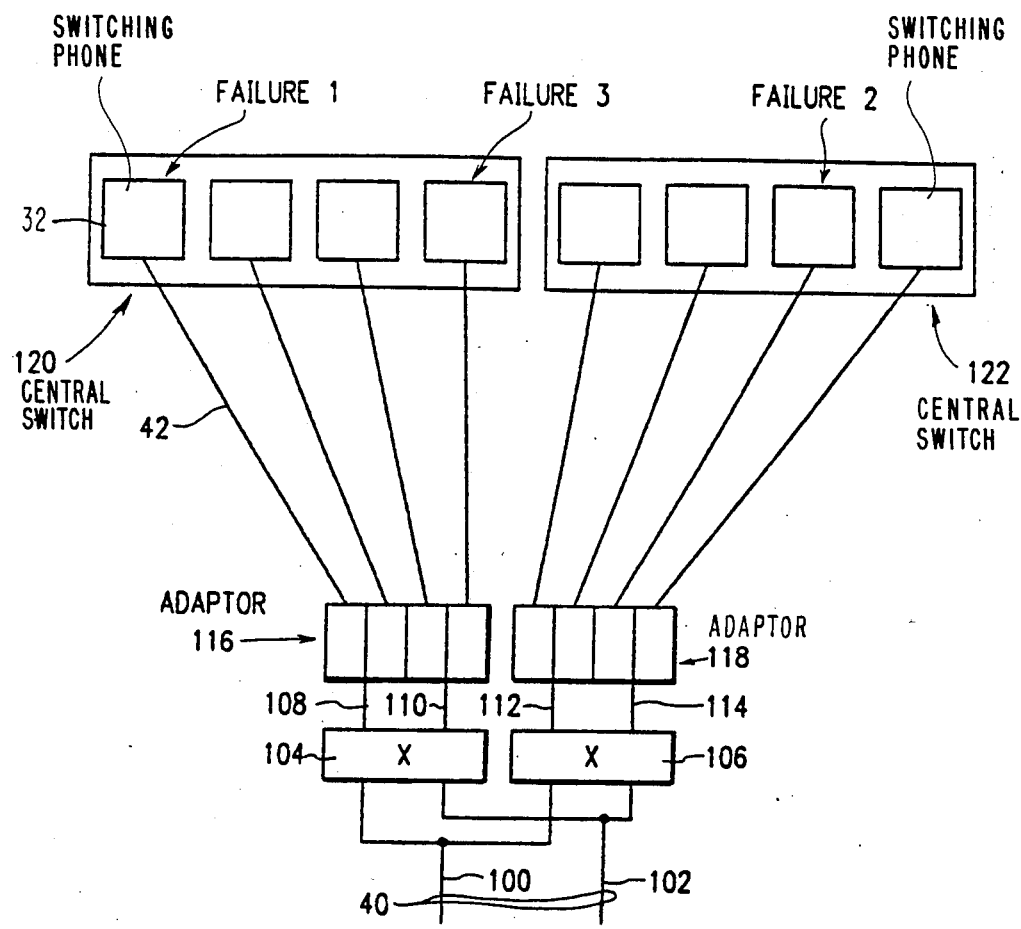
FIG. 8 is a block diagram of the switching system of yet another embodiment of this invention.

One of the principle advantages of the autonomous multiple planes is the allowance for increased reliability. Although the individual planes 32 and the individual serial links 42 may fail, if spare planes are provided in the central switch 32, the spare planes may replace failed planes or serial links, thereby dramatically increasing the overall reliability of the system. However, the adaptors 38 have a fairly complex structure and present a source for one-point failure for the user 34 to which they are attached. A further embodiment of the invention is illustrated in FIG. 8 and is intended to provide for fault tolerance in the complex adaptors 38. For this system, it is assumed that a fully operable system uses four serial links 42 and that the internal memory bus 40 consists of two internal lines 100 and 102. Both internal lines 100 and 102 are connected to two switches 104 and 106, both of which can switch the internal lines 100 and 102 to either one of the associated output lines 108 and 110 or 112 and 114.

Each one of the output lines 108–114 provides information to two mini-adaptors. There are four mini-adaptors in a first adaptor 116 and also in a second adaptor 118. Each mini-adaptor is connected by a serial link 42 to a switching plane 32. There are four switching planes 32 in a first central switch 120 and four more in a second central switch 122. Thus there are twice as many switching planes 32 as would be required for a fully operable system. However, the configuration of FIG. 8 differs from that shown in FIG. 3 in that the inputs to the mini-adaptors can only be distributed to one of two mini-adaptors and only one of these two mini-adaptors is being used at one time so that the switching is static rather than multiplexed. This system however provides very high reliability in that the failure of any component of the switch does not degrade the communication system. If either switch 104 or 106 fails, the data load may be handled by the remaining switch 104 or 106 and its associated adaptor 116 or 118 and a central switch 120 or 122. The same type of rerouting can be used if one of the adaptors 116 and 118 or one of the central switches 120 and 122 fails. Furthermore, two failures can be tolerated in the individual switching planes 32, the individual serial links 42, and in individual mini-adaptors. For this discussion, assume that a failure in a serial link 42 or a mini-adaptor is occurring in the associated switching plane 32. If two planes 32 within the same central switch 120 or 122 fails, the entire switch can be assumed to have failed. In this case, the entire traffic load can be rerouted to the remaining good central switch 120 or 122.

If however, both central switches 120 and 122 contain single planes 32 which have failed, there remain in both central switches 120 and 122 two neighboring planes fed by the same output lines 108-114 of the switches 104 and 106. Thus the switches 104 and 106 can route half the traffic through the two good neighboring planes 32 in each of the central switches 120 and 122. It is only the failure of a third plane 32 which may cause a degradation of bandwidth in the switching system. This degradation occurs when two nonneighboring planes 32 in one central switch 120 fails and another plane fails in the other central switch 122. Of course, many other fault tolerant systems may be designed incorporating this invention.

Although the previous description involves a fixed number of switching planes and serial links, all of which are being used, the invention can use a variable number of links depending on the size of the message. If only a short message is involved, then a single serial link and a single switching plane can be used. The transfer of a large amount of data could use all available parallel serial links and switching planes. Intermediate situations fall between these two extremes. Of course, the adaptors need to adjust for the variable number of links used.

Having thus described any invention, what I claim as new, and desire to secure by Letters Patent is:

1. A switching system for selectively connecting a plurality of users, comprising:
   (1) a central switching station, said central switching station comprising a plurality of switching units, each of said switching units comprising a plurality of switching planes;
   (2) a plurality of data links, each of said data links being coupled at a first end thereof to a respective one of said switching planes; and
   (3) a plurality of user stations, each of said user stations comprising:
      a. a plurality of switching adaptor means for dividing data messages to be transmitted to another user station onto a plurality of said data links and for receiving divided data messages on said data links and recombining said divided data messages, at least one of said adaptor means being provided for each of said switching units, each of said adaptor means comprising a plurality of sets of mini-adaptors, each of said mini-adaptors being coupled to a second end of a respective one of said data links; and
      b. switching means for distributing data between internal data lines of said user station and selected ones of said mini-adaptors of selected sets of mini-adaptors, only one mini-adaptor of any one set being selected at any one time;
   wherein failure of at least one switching plane within each of said switching units can occur without loss of bandwidth for message transmission between pairs of users connected through said central switching station and said bandwidth can be varied by selection of a number of sets of said mini-adaptors used for transmission.

2. The switching system of claim 1, wherein each of said switching planes comprises a cross-point switching matrix.

3. The switching system of claim 2, wherein each said switching matrix comprises means for setting connections through said switching matrix in response to control messages received from said user stations.

4. The switching system of claim 3, wherein said connections setting means in response to an idle control message from a user station connects said user station back to itself.

5. The switching system of claim 1, wherein each of said data links is a serial data link.

6. The switching system of claim 1, wherein each of said data links comprises a full-duplex pair of an input link and an output link.

* * * * *